UNITED STATES PATENT OFFICE.

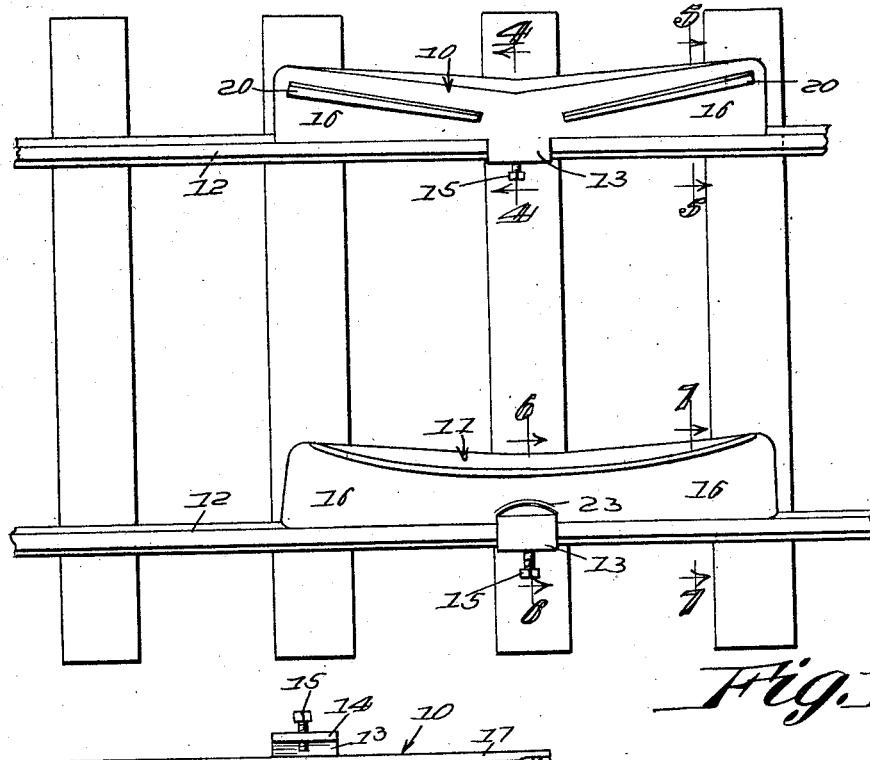

THEODORE RIVARD, OF NEWPORT, VERMONT.

RERAILER.

1,389,383.
Specification of Letters Patent.
Patented Aug. 30, 1921.

Application filed July 21, 1919. Serial No. 312,332.

*To all whom it may concern:*

Be it known that I, THEODORE RIVARD, a citizen of the United States, residing at Newport, in the county of Orleans and State of Vermont, have invented new and useful Improvements in a Rerailer, of which the following is a specification.

The object of the invention is to provide a simple and relatively inexpensive rerailing device for use in connection with railway tracks for reseating derailed car wheels and the same consists in a construction and combination of parts of which a preferred embodiment is illustrated in the accompanying drawings, wherein:

Figure 1 is a plan view of a pair of coöperating rerailing elements embodying the invention.

Fig. 2 is an inverted plan view of one of the elements.

Fig. 3 is a similar view of the other element.

Figs. 4, 5, 6 and 7 are transverse sectional views on the planes indicated respectively by the lines 4—4, 5—5, 6—6 and 7—7 of Fig. 1.

As in the ordinary practice the elements 10 and 11 of the rerailing device are adapted to be arranged on the sides of the track rails 12 to permit of ready mounting of the elements by the wheels as said wheels come in contact with the terminals thereof, said elements being secured against displacement during the rerailing operation by means of clamps 13 for engaging the rail treads and having depending ears 14 in which are threaded the set screws 15 for engagement under the rail heads. The rerailing elements which may be castings or forgings are hollow and are constructed to form opposite inclines 16 supported by inner and outer walls 17 and 18 of which the former are disposed close to the rail heads and rest at their lower edges preferably upon the rail feet or bases. At the ends the elements may be provided with downwardly directed supports 19 to prevent the endwise displacement as the car wheels encounter the same. The tread surfaces of the elements incline forward from the extremities toward the center and at the same time incline laterally toward or from the plane of the rail. For example, at the lower or terminal portions of the incline tread surfaces of the member of the element 10 the lateral inclination is downward from the rail so as to tend to hold the wheel flanges in contact with a diagonally disposed guide rib or flange 20 disposed on said tread surfaces while the terminal portions of the tread surface of the element 11 inclines downward toward the plane of the rail as shown in Fig. 7, the outer portion of the surface being provided with a guard rib 21. At their centers or at the apex of the tread surfaces, however, this relation is reversed as shown by comparison of Figs. 4 and 6 of the drawings, wherein the element 10 has its tread surface inclined downwardly toward the rail to form a duplicating element 22, to cause the flange of the wheel to pass over the head of the rail and drop inside of the same, while the tread surface of the element 11 at its apex, though inclined toward the rail is depressed as at 23 in a plane near the inside surface of the rail tread in order to prevent the wheel flange from passing beyond the plane of the rail tread.

The lateral inclinations of the tread surfaces of the rerailer elements at the lower or terminal portions thereof serve to prevent the wheels from prematurely coming into contact with the rails as they mount the tread surface of the rerailer, and when the treads of the wheels reach the level of the rail treads the disposition of the tread surfaces is to cause the inner wheel flange to pass over the rail tread while the far wheel flange is restrained and caused to drop in a plane at the inside of the adjacent rail tread. This substantially reversed lateral inclination of the tread surfaces of the rerailer elements as they progress from the terminal toward the central or elevated portions thereof serves to effect the lateral shifting of the car wheels at the proper time while holding them out of contact with the rails during the mounting of the tread surfaces to the approximate level of the rail treads. As a consequence the shifting of the wheels after they have been elevated by means of supplemental devices such as jacks or crow bars is avoided and replacement of a car or truck upon the rails is effected, after the proper positioning of the rerailer elements, merely by the progress with relation thereto of the wheels of the truck under such propelling influence as may be available in that connection.

The invention having been described, what is claimed as new and useful is:

A rerailer consisting of a duality of elements for location respectively adjacent the inner and outer sides of opposite rails, the one being formed with a tread surface inclining upwardly from the extremities to the center and inclining downward and laterally away from the rail tread, said element on its inclined portions being provided with diagonally disposed guide ribs and having at its apex a crown higher than and inclined toward the rail tread, the other element inclining upwardly from its extremities toward the center with its tread surface inclining downwardly in a lateral direction toward the plane of the rail and being depressed in a plane near the inside surface of the rail tread, said other element having its tread surface provided with a guard rib extending substantially throughout the length thereof.

In testimony whereof I affix my signature.

THEODORE RIVARD.